United States Patent [19]

Burkhardt et al.

[11] 4,274,773
[45] Jun. 23, 1981

[54] ROTARY INDEX TABLE

[75] Inventors: Friedrich Burkhardt, Eislingen/Fils; Hans Staiger, Göppingen, both of Fed. Rep. of Germany

[73] Assignee: Ex-Cell-O GmbH, Eislingen/Fils, Fed. Rep. of Germany

[21] Appl. No.: 35,057

[22] Filed: May 1, 1979

[30] Foreign Application Priority Data

May 3, 1978 [DE] Fed. Rep. of Germany ....... 2819412

[51] Int. Cl.³ .............................................. B23Q 3/18
[52] U.S. Cl. ....................................... 409/221; 269/61
[58] Field of Search ....................... 269/61, 63, 64, 65, 269/59, 57; 51/216 ND, 216 H, 240 T; 74/813 L, 816; 409/219, 221, 224; 408/71

[56] References Cited

U.S. PATENT DOCUMENTS

| 2,570,444 | 10/1951 | Henkel | 409/221 |
|---|---|---|---|
| 3,049,032 | 8/1962 | Schabat | 269/64 |
| 3,961,780 | 6/1976 | Saj | 269/64 |

FOREIGN PATENT DOCUMENTS 2628677 12/1977 Fed. Rep. of Germany .

Primary Examiner—Robert C. Watson
Attorney, Agent, or Firm—John C. Evans; James H. Bower; Mitchell J. Hill

[57] ABSTRACT

The invention relates to a rotary index table comprising a stationary table housing, a table plate which is designed for reception of the workpiece and rotation by a drive means mounted on said table housing, a total of three Hirth-type serrations arranged concentrically with respect to one another, namely a first on said table housing, a second on said table plate, preferably in the same plane as said first Hirth-type serration, and adjacent said first two Hirth-type serrations a third Hirth-type serration that is substantially non-rotatable, but is designed for axial adjustment and simultaneous engagement with and disengagement from said first two Hirth-type serrations so as to lock and unlock the latter, said table plate being rotatable by said drive means when the first and the second Hirth-type serrations are in the disengaged state and securable at least in angular positions determined by the pitch of the Hirth-type serrations by a brake means.

17 Claims, 4 Drawing Figures

ROTARY INDEX TABLE

BACKGROUND AND SUMMARY OF THE INVENTION

Rotary index tables in the form of turning of dividing tables on machine tools have hitherto been employed for establishing and measuring predetermined angular distances, cam tracks and the like.

Turning tables have the advantage that they can be fixed in any desired angular position. However, the brake means which such turning tables are provided with for maintaining the table in a stationary position cannot guarantee absolutely reliable securement of the table in the presence of strong displacement forces.

Dividing tables offer the advantage of being provided with Hirth-type serrations and are therefore able to resist even great displacement forces. On the other hand, dividing tables can only be fixed in predetermined angular positions corresponding to a multiple of the pitch of the Hirth-type serration.

In view of the disadvantages that have to be tolerated in both known table constructions, successive machining of workpieces on the two known types of rotary index tables is often unavoidable in manufacturing technology.

Accordingly, the object underlying the invention was to produce a rotary index table which unites the advantages of the known turning and dividing tables within itself and can therefore be universally employed on machine tools both as a turning and dividing table.

The object underlying the invention is attained by a rotary index table of the type described at the beginning in accordance with German Published patent application No. 1,962,097.

If, for example, predetermined angular distances corresponding to a multiple of the tooth pitch of the Hirth-type serrations are to be established on the rotary index table according to the invention, the table plate can be secured in position on the table housing by the Hirth-type serrations.

If, on the other hand, the table plate is to be rotated through angles which cannot be set by the Hirth-type serrations on the basis of their pitch, the table plate can be secured in position on the table housing by the brake means, once it has been adjusted to the respective angular position. Thus, the table plate can also be secured in any angular position.

It is advisable to electronically control the drive means for adjustment of the table plate through both predetermined turning angles which can be established by the tooth pitch of the Hirth-type serrations and turning angles of any size, so that the angular positions of the table plate that are to be selected successively can be programmed in the controls of the respective machine in advance and then automatically performed.

Electronic control of the drive means for determining measurement values corresponding to angular positions to be selected can be effected by a direct electronic measurement system (rotary inductosyn system) or advantageously by an indirect measurement system (resolver measurement).

The rotary index table according to the invention offers the following adjustment possibilities, assuming that the Hirth-type serrations have a tooth pitch of one degree. In this case, the table plate can be secured in 360 positions with the aid of the Hirth-type serrations. Used as a turning table with a direct and/or indirect electronic measurement system for controlling the drive means, the table plate can in accordance with the resolver power of the measurement system and the electronic machine controls be adjusted to, for instance, 360,000 positions. If, on the other hand, the Hirth-type serrations have a pitch of 0.5°, the table plate can be adjusted to 720 positions with the aid of the Hirth-type serrations.

If the rotary index table is used as a dividing table, raising of the table plate from the table housing so as to disengage the Hirth-type serrations for indexing the table plate can be avoided. In this case, it is expedient for the adjustment member for raising and lowering the carrier plate to be in the form of an adjustable wedge which can cooperate suitably with a guide shaft that is guided in the table housing and carries the carrier plate. The construction disclosed constitutes a preferred embodiment of the invention which enables positive guidance of the carrier plate in both of its directions of movement. The toothed ring provided therein enables, in addition to a favorable arrangement of a Hirth-type serration on the table plate, an advantageous drive connection between the table plate and the drive means, if, the toothed ring comprises at its circumference a ring gear which meshes with a drive wheel of the drive means. The ring gear and the drive wheel can be in the form of spur gears which mesh with one another, and the brake means must be designed such that it enables either a decrease in the flank play or absolutely reliable securement of the table plate relative to the table housing, depending on how the rotary index table is to be used.

By the simple structural measure disclosed, the flank play can be reduced and the toothed ring detained, respectively. If, for example, the table plate is to be driven for milling cam tracks, the flank play can be reduced to an advantageous value in the manner disclosed. On the other hand, the flank play can be correspondingly enlarged at short notice if the table plate is to be operated at rapid traverse rate. Finally, the tooth flanks can be brought together under pressure in order to secure the table plate.

In a preferred embodiment of the invention, the drive means and the brake means constitute one component, as disclosed, which is designed such that the drive wheel of the drive means which meshes with the ring gear of the toothed ring on the table plate constitutes at the same time the brake member for securing the ring gear and the table plate, respectively.

A construction which distinguishes itself by way of particular structural simplicity and functional reliability can be obtained by having the ring gear of the toothed ring take the form of a worm gear which meshes with a drive worm of the drive and brake means, said drive worm being adapted to be radially displaced by the brake means in the direction of the worm gear so as to secure the worm gear and the table plate, respectively, and to engage with the flanks of the worm gear under pressure. In this way, any play between the tooth flanks of the worm gear and the threads of the drive worm is eliminated, and the table plate is thereby locked to the table housing in an absolutely reliable manner, provided that the drive worm is free of play in both axial directions. The subject matter of the invention constitutes further advantageous embodiments of the drive and brake means in the form of one component.

Further features and details of the invention are apparent from the following description of a preferred embodiment of a rotary index table according to the invention, as illustrated in the drawings, and also from the patent claims.

DETAILED DESCRIPTION OF THE INVENTION

Figure 1:
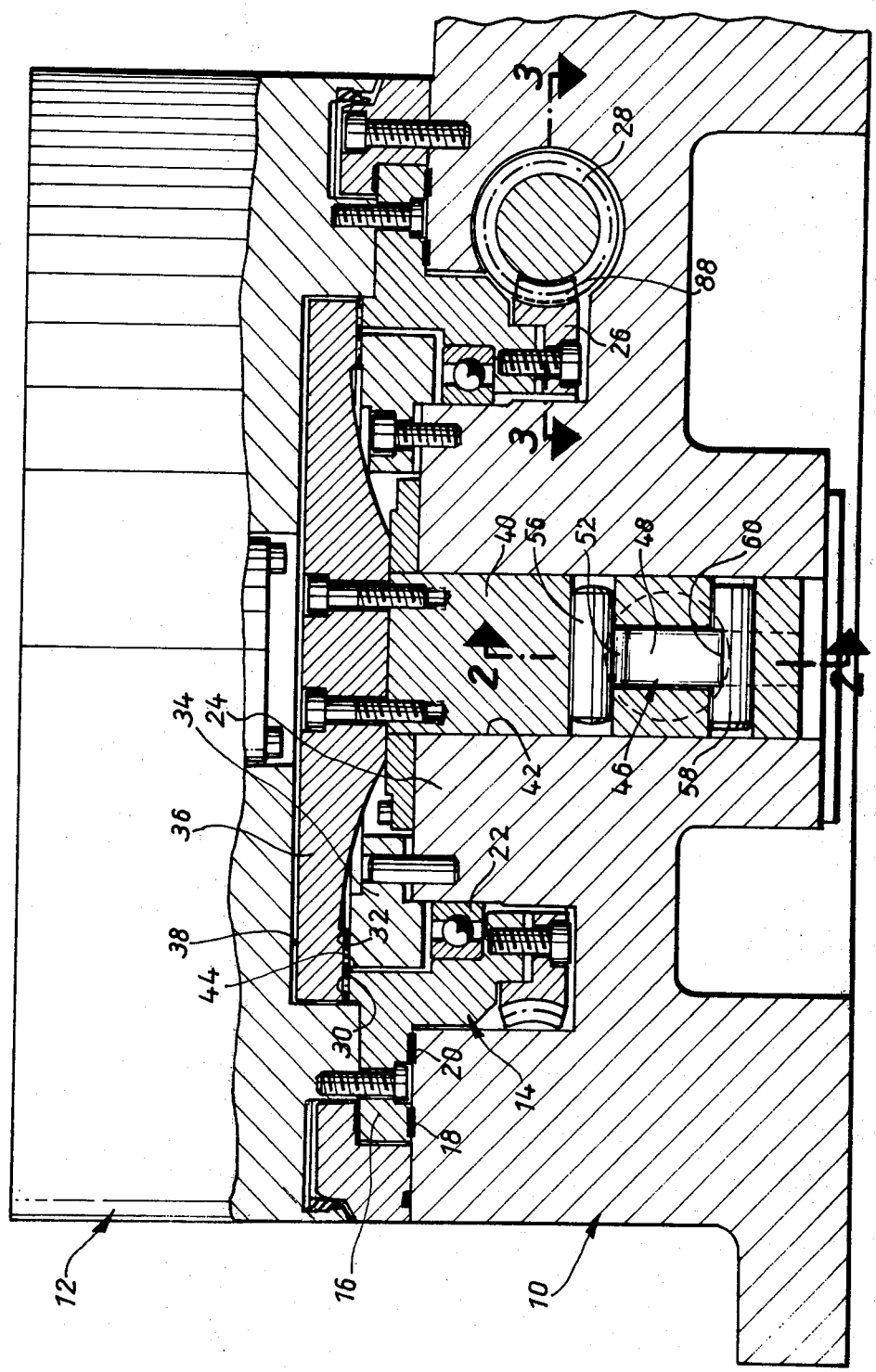
FIG. 1 is a shortened side view and partially a longitudinal cross-sectional view of the rotary index table, wherein the table plate and the table housing are coupled to each other by positively held interlocking Hirth-type serrations.

The rotary index table illustrated in FIG. 1 comprises a stationary table housing designated in toto 10, with a table plate 12 rotatable relative to said table housing mounted thereon. The table plate comprises a toothed ring 14 secured to the center of its bottom face for the purpose of mounting it on the table housing. The toothed ring rests with an outer flange 16, for example, on two flat slide rings 18, 20 consisting of a suitable plastics material and arranged concentrically on the top face of the table housing, and is, therefore, supported in an axial direction. In a radial direction, this toothed ring is preferably rotatably mounted with the aid of a radial ball bearing 22 on a central upwardly extending shaft portion 24 of the table housing. In order to drive the table plate 12 and the toothed ring 14, respectively, the toothed ring 14 comprises on its outer circumference a ring gear which preferably constitutes a worm gear 26. A drive worm 28 meshes with the latter.

As illustrated in FIG. 1, a first Hirth-type serration 30 is integral with the top face of the toothed ring 14. A second Hirth-type serration 32, which is concentric with and located in the same plane as the first Hirth-type serration 30, is integral with the top face of a coupling ring 34 which is, for example, rigidly connected by screws and pins to the table housing 10 on the top face of the shaft portion 24 of the table housing 10. 36 designates a disc-shaped carrier plate which is located in a space 38 provided between the table housing 10 and the table plate 12. This carrier plate 36 comprises on its underside a cylindrical guide shaft 40 which is axially displaceable, but substantially non-rotatably guided in an axial cylindrical recess 42 in the shaft portion 24 of the table housing.

The carrier plate 36 overlaps with its edge the two Hirth-type serrations 30 of the toothed ring 14 and 32 of the coupling ring 34 and comprises on its face directed towards these Hirth-type serrations a third Hirth-type serration 44 which toothing bridges the first and second Hirth-type serrations and which toothing ridges lie in a common transverse plane perpendicular to the axis of the table plate.

For axial adjustment of the carrier plate accommodating the third Hirth-type serration 44, there is provided, for example, an adjustment member designated in toto 46 which is disposed in the table housing 10 for adjustment perpendicular to the direction of adjustment of the cylindrical guide shaft 40 and is actuatable by a suitable actuation device.

The front end 48 of the adjustment member 46 extends into the cylindrical recess 42 and into a window-like recess 50, which preferably extends throughout the cylindrical guide shaft 40 in a transverse direction, the width of the recess 50 being slightly larger than the width of the front end of the adjustment member 46.

Figure 2:
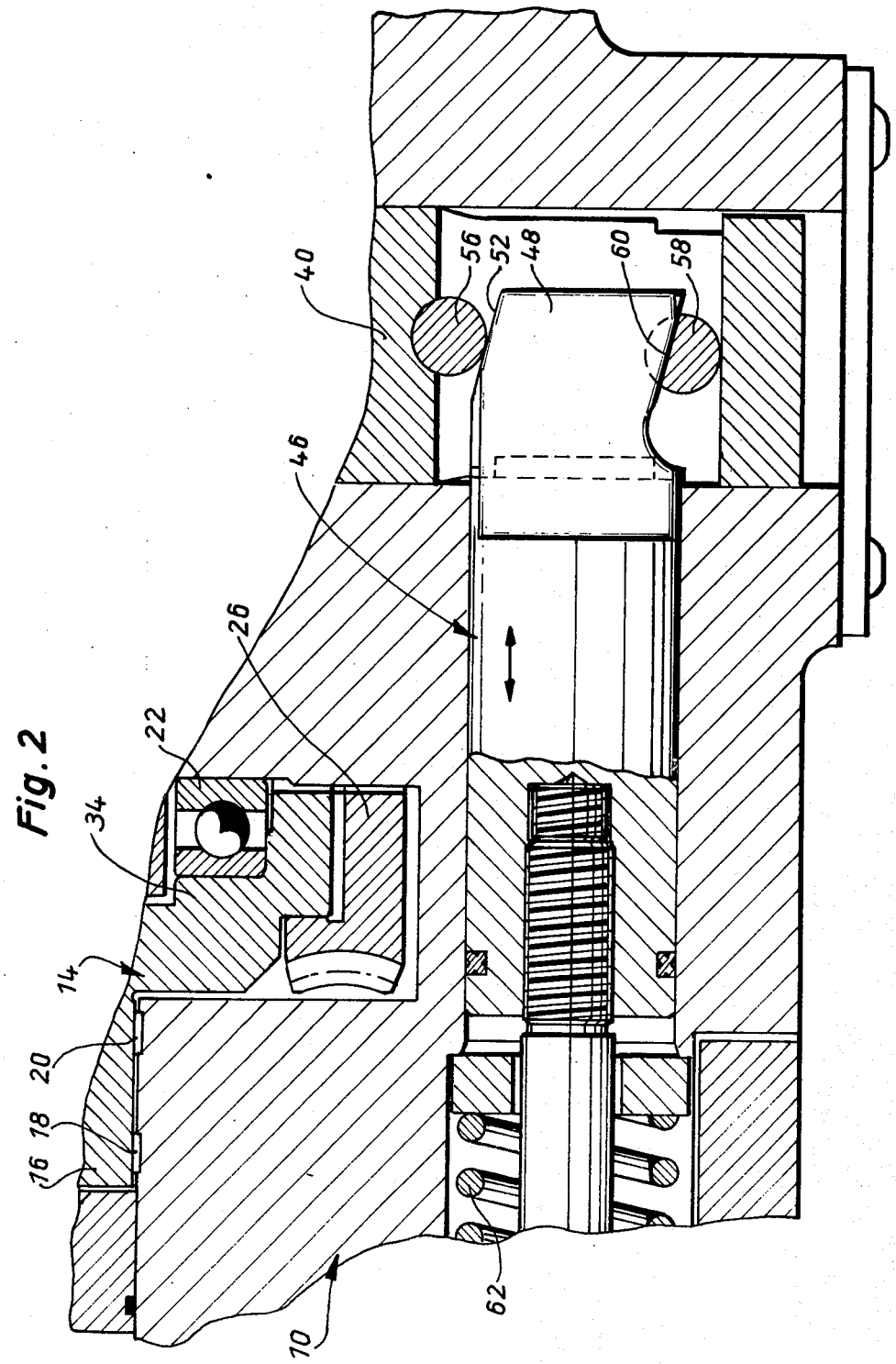
FIG. 2 is a partial section along line 2—2 in FIG. 1, on a larger scale than FIG. 1.

As shown in FIG. 2, the adjustment member 46 comprises at its front end 48 a top wedge surface 52 and a bottom wedge surface 54 parallel to the former, which extends in the direction of motion of the adjustment member and, as viewed in FIG. 2, are downwardly inclined in the direction of the face of the front end 48. Two cylindrical bolts 56, 58 are arranged in the recess 50 of the cylindrical guide shaft 40 so as to extend through the recess in a transverse direction. The upper bolt 56 touches the top wedge surface 52 along a circumferential line while the lower bolt 58 comprises at its circumference a transverse groove whose groove bottom 60 rests against the bottom wedge surface 54.

When the adjustment member as illustrated in FIG. 2 is moved to the right by pressure medium actuation, the cylindrical guide shaft 40 is thereby directed upwardly and the third Hirth-type serration 44 on the carrier plate 36 is disengaged. In this case, the table plate 12 can be turned about its axis via the drive worm 28 through worm gear 26 to the toothed ring 14 in order to carry out a readjustment.

When the adjustment member 46 as shown in FIG. 2 is moved to the left, which can be effected, for example, by a pressure spring 62, the carrier plate 36 is thereby lowered and its Hirth-type serration 44 engages again in a positively held manner with the two other Hirth-type serrations 30, 32.

The toothed ring 14 which is firmly connected to the table plate 12 by means of bolts 96 is thereby coupled with the coupling ring 34 through toothed serrations 30, 44 and 32 locked to the table housing 10. The table plate 12 is thus fixed relative to the table housing 10 in an angular position established by the pitch of the Hirth-type serrations.

In accordance with the invention, a brake means is associated with the table plate 12. This brake means enables the table plate 12 to be fixed in any angular position relative to the table housing 10 when the carrier plate 36 is in the raised position, and the table plate 12 is disengaged from the table housing 10, respectively. In the instant embodiment, the drive means and the brake means constitute one component so that the drive worm 28 operates as both drive and brake member.

The drive worm 28 is disposed on the front end of a drive shaft 68 mounted in a bearing sleeve 66 for rotation with said drive shaft. The drive shaft is mounted in the bearing sleeve so as to be capable of receiving both radially and axially directed forces without play. The bearing sleeve 66 extends through a receiving bore 70 in the table housing 10 with radial play and is secured at its rear end in a receiving member 72. The latter consists of two coaxial portions 74,76 which, as shown in FIG. 4, can, for example, be of square peripheral configuration, said portion 76 being secured to the table housing 10 by attachment screws 79, and said portion 74 being flexibly connected to said portion 76.

Figure 3:
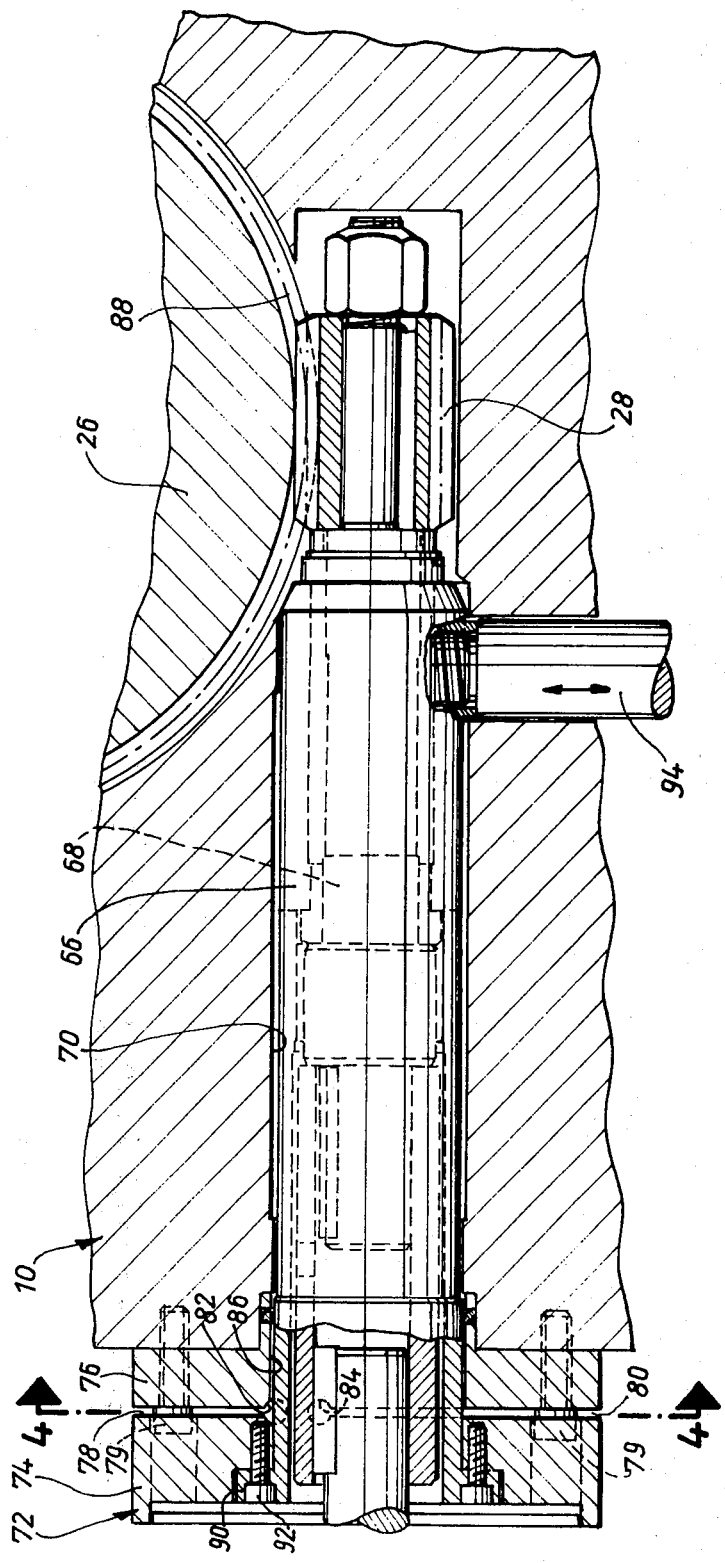
FIG. 3 is a partial section along line 3—3 in FIG. 1, on a larger scale than FIG. 1.
Figure 4:
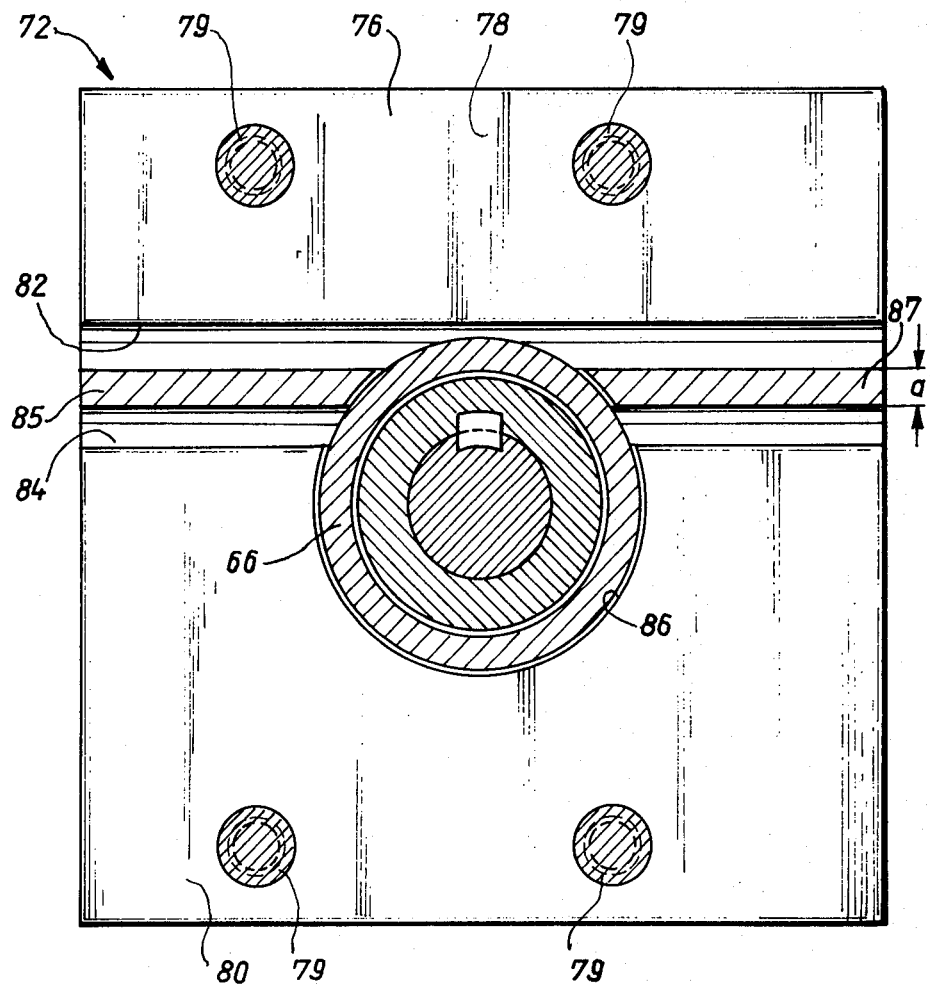
FIG. 4 is a section along line 4—4 in FIG. 3, on a larger scale than FIG. 3.

For this purpose, the receiving body 72 comprises slits 78 and 80 extending from the top and the bottom in a common plane and ending at a distance a from each other (see FIG. 4). The inside area of both slits is extended by a bore 82, 84, respectively. These slits and a central bore 86 through which the bearing sleeve 66 extends, form two laterally spaced connection links 85, 87, which, as shown in FIG. 3, are located in a plane perpendicular to the drawing plane, with their transverse center line located in a plane tangential to the pitch circle 88 of the worm gear 26. These links 85, 87 thus define a swivel axis about which the bearing sleeve is radially deflectable together with the drive shaft 68 and the drive worm 28 in the direction of the worm gear.

As shown in FIG. 3, the bearing sleeve 66 is held in portion 74 of the receiving member 72 by way of a flange 90 and attachment screws 92. Portion 74 of the receiving member 72 also accommodates the drive unit of the drive means, which is, however, not illustrated in detail.

94 designates an actuation rod of a brake means which is combined with the drive means and is not illustrated in detail. The actuation rod is secured to the front end of the bearing sleeve 66 perpendicular to the longitudinal axis of the latter and in the plane of the worm gear 26.

The drive means which drives the drive worm 28 is controllable by an electronic measurement system, more particularly, an indirect measurement system (resolver measurement) so that the table plate 12 can be successively adjusted to predetermined angular positions.

If it is intended to employ the rotary index table as dividing table, the angular positions of the table plate are determined by the tooth pitch of the Hirth-type serrations 30, 32, 44. If, on the other hand, the rotary index table is to be set at angular positions that deviate from a multiple of the pitch of the Hirth-type serrations, the carrier plate 36 is not to be lowered, and the Hirth-type serrations 30, 32 are not to be coupled, once the desired angular position has been attained, but rather the worm gear 26 and thus the toothed ring 14 and the table plate 12 are to be fixed relative to the table housing 10 by the brake means. To this end, the bearing sleeve 66 is deflected in the direction of the worm gear 26 by the actuation rod 94 of the brake means, which is enabled by the mutual flexible connection of the two portions 74, 76 of the receiving member 72 by the links 85, 87. The flanks of the worm threads of the drive worm 28 are thereby urged against the tooth flanks of the worm gear 26 under pressure, which results in engagement of the worm gear 26 and the drive worm 28 without play. This prevents the worm gear 26 and thus the table plate 12 from turning about the axis of rotation. In this way, it is possible to employ the rotary index table as a turning table whose table plate can be fixed in any angular position on the table housing.

We claim:

1. Rotary index table, comprising: a stationary table housing with a rotatable table plate for workpiece accomodation, a drive means for driving said rotatable table plate, said drive means having a worm gear arranged concentrically to the axis of said table plate and which engages a drive worm located on a drive shaft of the drive means, a plurality of three concentrically arranged Hirth-type serrations, a first serration of which being provided on said table housing, a second on said table plate in the same plane as said first serration, and a third serration adjacent to said first and second serrations being essentially non-rotatable but axially adjustable and being so designed that simultaneously with the two other Hirth-type serrations it can be engaged or disengaged for locking or unlocking said table, whereby, the table plate in the disengaged condition of the first and second Hirth-type serrations can steplessly be rotated by the drive means and be fixed in at least those angular positions that are established by the pitch of the Hirth-type serrations, characterized in that drive worm (28) can radially be deflected in the direction of worm gear (26) by means of an actuating mechanism and be brought under load into contact with the flanks of worm gear (26).

2. Rotary index table in accordance with claim 1, characterized in that the drive worm (28) is arranged on the front end of drive shaft (68), which is supported in a bearing sleeve (66); said bearing sleeve is retained only at its rear end; and, means for moving said worm gear bearing sleeve (66) radially in the direction of worm gear (26) by means of an actuating mechanism.

3. Rotary index table in accordance with claim 2, characterized in that bearing sleeve (66) with its rear end retained in a receiving member (72), said member being flexibly connected with table housing (10) so as to enable radial deflection of bearing sleeve (66).

4. Rotary index table in accordance with claim 3, characterized in that receiving member (72) is formed by two portions (74, 76), which are arranged at a distance one behind the other and are flexibly connected to each other, one of which being secured to table housing (10) while to the other the rear end of bearing sleeve (66) is attached, which penetrates portion (76) secured to table housing (10) with radial play and is radially deflectable by the actuating mechanism towards worm gear (26).

5. Rotary index table in accordance with claim 1, characterized in that both portions (74,76) of receiving member (72), are arranged parallel to one another, are connected to each other by means of two laterally spaced connecting links (85, 87), which together define a swivel axis being parallel to the worm gear axis and being located within a plane essentially tangent to pitch circle (88) of worm gear (26).

6. Rotary index table as claimed in claim 1, characterized in that the third Hirth-type serration (44) is arranged in a known manner on one face of a carrier plate (36) disposed in a space (38) available between the table housing (10) and the table plate (12), said carrier plate being mounted with a guide shaft (40) for non-rotation, but vertical adjustment, in a guide recess (42) of said table housing (10), said adjustment being effected by an adjustment member (46) which is arranged in said table housing (10) and comprises at least one cam (52) that cooperates with said guide shaft (40).

7. Rotary index table as claimed in claim 6, characterized in that the adjustment member (46) comprises a wedge which is adjustable perpendicular to the guide recess (42), extends with its front end (48) into the guide recess (42) and comprises at said front end at least one inclined wedge surface (52) extending in the direction of adjustment of the adjustment member (46) and cooperating with the carrier plate guide shaft (40).

8. Rotary index table as claimed in claim 7, characterized in that the front end (48) of the adjustment member (46) extends into a recess (50) of the carrier plate guide shaft (40) and comprises two parallel wedge surfaces (52, 54) located at opposite sides, with one bolt (56, 58, respectively) resting against each of said wedge surfaces, said bolts being disposed in the guide recess (42) perpendicular to the direction of adjustment of the adjustment member (46) and parallel to the associated wedge surface (56, 58, respectively).

9. Rotary index table as claimed in claim 1 characterized in that the Hirth-type serration (30) which is connected to the table plate (12) is disposed on, more particularly, integral with one face of a toothed ring (14) that is secured to the bottom face of said table plate (12), is supported by way of an outer flange (16) on at least one horizontal bearing surface (18 or 20) of the table housing (10) and is mounted by means of a bearing, more particularly, a radial ball bearing (22), on a shaft portion (24) of said table housing (10).

10. Rotary index table as claimed in claim 9, characterized in that the toothed ring (14) comprises at its circumference a ring gear which meshes with a drive wheel of the drive means so as to drive the table plate (12).

11. Rotary index table as claimed in claim 10, characterized in that the drive means and brake means constitute one component.

12. Rotary index table as claimed in claim 10 or claim 11, characterized in that the drive wheel or drive means that drives the toothed ring (14) can be radially deflected by an actuation device in the direction of the ring gear of the toothed ring (14) and can be made to engage, more particularly, under pressure, with the flanks of the ring gear.

13. Rotary index table as claimed in claim 10, characterized in that the ring gear of the toothed ring constitutes a worm gear (26) that meshes with a drive worm (28) of the drive and brake means, said drive worm (28) being radially displaceable by said brake means in the direction of said worm gear (26) so as to eliminate flank play or to secure the worm gear (26) and the table plate (12), respectively.

14. Rotary index table as claimed in claim 13, characterized in that the drive worm (28) is disposed at the front end of a drive shaft (68) which, in turn, is mounted in a bearing sleeve (66) that is retained solely at its rear end and can be radially deflected by the brake means in the direction of the worm gear (26) so as to secure said worm gear (26).

15. Rotary index table as claimed in claim 14, characterized in that the bearing sleeve (66) is retained with its rear end in a receiving member (72) which at the same time accommodates the drive motor and possibly further components of the drive means, and, in turn, is flexibly connected to the table housing (10) so as to enable radial deflection of the bearing sleeve (66).

16. Rotary index table as claimed in claim 15, characterized in that the receiving member (72) is comprised of two portions (74, 76) arranged behind each other in spaced relationship and flexibly connected to each other, with one of said portions secured to the table housing (10) and the rear end of the bearing sleeve (66) retained in the other, said bearing sleeve penetrating said portion (76) secured to the table housing (10) with radial play and being radially deflectable by the brake means in the direction of the worm gear (26).

17. Rotary index table as claimed in claim 16, characterized in that the two portions (74, 76) of the receiving member (72) which, more particularly, are of plate-shaped configuration and are arranged in spaced parallel relationship, are connected to each other by two laterally spaced connecting links (85, 87) which together define a swivel axis that extends parallel to the worm gear axis and is located in a plane substantially tangential to the pitch circle (88) of the worm gear.

* * * * *